US012257798B2

(12) United States Patent
Meier et al.

(10) Patent No.: US 12,257,798 B2
(45) Date of Patent: Mar. 25, 2025

(54) ENVELOPE SPREADER SYSTEM FOR ENVELOPING A RETREADED TIRE

(71) Applicant: BRIDGESTONE BANDAG, LLC, Nashville, TN (US)

(72) Inventors: Merle E. Meier, Nashville, TN (US); Jaime J. Benitez, Nashville, TN (US); Jeremy J. Nartker, Nashville, TN (US)

(73) Assignee: Bridgestone Bandag, LLC, Nashville, TN (US)

( * ) Notice: Subject to any disclaimer, the term of this patent is extended or adjusted under 35 U.S.C. 154(b) by 0 days.

(21) Appl. No.: 18/095,347

(22) Filed: Jan. 10, 2023

(65) Prior Publication Data
US 2023/0219314 A1 Jul. 13, 2023

Related U.S. Application Data

(60) Provisional application No. 63/298,281, filed on Jan. 11, 2022.

(51) Int. Cl.
*B29D 30/54* (2006.01)

(52) U.S. Cl.
CPC ...... *B29D 30/542* (2013.01); *B29D 2030/543* (2013.01)

(58) Field of Classification Search
CPC ................ B29D 2030/543; B29D 30/542
See application file for complete search history.

(56) References Cited

U.S. PATENT DOCUMENTS

| 1,811,284 A | 6/1931 | Sords |
| 4,836,877 A | 6/1989 | Perdue |
| 4,902,380 A | 2/1990 | Olson |

(Continued)

FOREIGN PATENT DOCUMENTS

| BR | MU8700993 U2 | 2/2009 |
| DE | 10 2013 204 423 A1 | 10/2014 |

(Continued)

OTHER PUBLICATIONS

Mun. KR2012116173. 2012. ESpaceNet Machine Translation (Year: 2024).*

(Continued)

*Primary Examiner* — Katelyn W Smith
*Assistant Examiner* — Alexander D Booth
(74) *Attorney, Agent, or Firm* — Matthew Jupina; Kiri Sharon (57) ABSTRACT

An envelope spreader system includes a chassis having an opening, a linkage assembly comprising a plurality of links rotatably coupled to the chassis and extending into the opening, and an actuator operably coupled to the linkage assembly and configured to operate the linkage assembly between a first position and a second position. The plurality of links includes a primary link having a primary link first end rotatably coupled to the chassis at a first fixed pivot point and a primary link second end configured to operably engage a portion of a tire envelope and a secondary link having a secondary link first end rotatably coupled to the chassis at a second fixed pivot point and a secondary link second end configured to engage a portion the tire envelope.

12 Claims, 10 Drawing Sheets

(56) References Cited

U.S. PATENT DOCUMENTS

| | | | | |
|---|---|---|---|---|
| 5,658,419 A | * | 8/1997 | Herron | B29D 30/542 |
| | | | | 156/394.1 |
| 6,220,572 B1 | * | 4/2001 | Louchart, III | B60C 25/14 |
| | | | | 269/48.1 |
| 6,521,071 B2 | | 2/2003 | Parrish et al. | |
| 7,114,935 B2 | | 10/2006 | Thomas et al. | |

FOREIGN PATENT DOCUMENTS

| | | | | |
|---|---|---|---|---|
| JP | 2011056693 A | * | 3/2011 | |
| KR | 2012116173 A | * | 10/2012 | |
| WO | WO-2006107158 A1 | * | 10/2006 | B29D 30/54 |

OTHER PUBLICATIONS

Elgi Envelope Spreader—ES 6 series, Elgi Rubber, www.elgirubber.com/products/envelope-spreader.php [accessed Feb. 23, 2021], 3 pages.

Melion Envelope Spreader—Tire Retreading Machines, Tyre Retread Equipment, Precured Tread Rubber, Melion Industry Co., Ltd., www.melioretread.com/product/envelope-spreader/ [accessed Feb. 23, 2021], 4 pages.

TecknoMechanics; Pneumatic Cylinder Working explained (Animation), Mar. 7, 2020, https://www.youtube.com/watch?v=hmz1h5fk2bl [accessed Sep. 10, 2021].

Yton Envelope Spreader Tyre Retreading Equipment for Envelope Load [accessed Feb. 23, 2021], 2 pages.

\* cited by examiner

ENVELOPE SPREADER SYSTEM FOR ENVELOPING A RETREADED TIRE

CROSS-REFERENCE TO RELATED APPLICATIONS

This application claims priority to and the benefit of U.S. Provisional Patent Application No. 63/298,281, filed Jan. 11, 2022, the content of which is herein incorporated by reference.

FIELD

The present disclosure relates generally to processing of retreaded tires.

BACKGROUND

Retreaded tires provide an economical way to gain additional use from tire casings after the original tread or retread has become worn. According to a conventional method of retreading, sometimes referred to as cold process retreading, worn tire tread on a used tire is removed to create a buffed, treadless surface about the circumference of the tire casing to which a new layer of tread may be bonded.

The tire casing is then typically inspected for irregularities, some of which may be skived and filled with a repair gum while others may warrant rejection of the casing. Next, a layer of cushion gum may be applied to the back, i.e., the inside surface of a new layer of tread, or alternatively, the layer of cushion gum may be applied directly to the tacky surface on the tire casing. Conventionally, the cushion gum is a layer of uncured rubber material. The cushion gum and tread may be applied in combination about the circumference of the tire casing to create a retreaded tire assembly for curing. As an alternative, a length of tire tread may be wrapped around the tire casing with the cushion gum already applied. The cushion gum may form the bond between the tread and the tire casing during curing.

New tread for precured retreading applications is typically molded as a single piece with the tread pattern on one side. Such treads are sometimes referred to a precured tread. The casing may be trimmed to fit the width of the precured tread. After the new precured tread is applied, a roller pressing process, commonly referred to as stitching, is next performed on the assembly to force air from between the tread strip and casing.

SUMMARY

According to the above-mentioned techniques, following assembly of the tire casing, cement, cushion gum, and a precured tire tread strip, the overall retreaded tire assembly may be placed within a flexible rubber envelope. An airtight seal may be created between the envelope and the beads of the tire. The entire envelope tire assembly may be placed within a curing chamber and subjected to a vulcanization process that binds the materials together.

However, the retreading process can be adversely impacted by systems designed to place the overall retreaded tire assembly within the flexible rubber envelope, where such systems impede the travel path of the overall retreaded tire assembly. In particular, such systems either require an overall retreaded tire assembly to make a detour from the travel path to be placed in the flexible rubber envelope or require the system to be manually moved to and from the travel path of the overall retreaded tire assembly. This causes the retreaded process to slow down by extending the travel path or by the constant need to position the system. The present disclosure addresses these and other issues.

At least one embodiment relates to an envelope spreader system. The envelope spreader system comprises a chassis having an opening, an actuator, and a linkage assembly. The linkage assembly comprises a plurality of links rotatably coupled to the chassis and extending into the opening. The actuator is operably coupled to the linkage assembly and configured to operate the linkage assembly between a first position and a second position.

Another embodiment relates to an envelope spreader system. The envelope spreader system comprises a linkage assembly operable between a first position and a second position. The linkage assembly comprises a plurality of links. Each of the plurality of links are rotatable about at least one pivot point of a plurality of pivot points and each of the plurality of pivot points are in a fixed position relative to one another. The actuator is operably coupled to the linkage assembly and configured to operate the linkage assembly between the first position and the second position.

DETAILED DESCRIPTION

Following below are more detailed descriptions of various concepts related to, and implementations of, a system for enveloping a retreaded tire. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Tires are used in various applications and under a variety of operational conditions. Some tires may be designed to withstand the forces of a landing aircraft. Some tires may be designed to provide extra grip on surfaces covered in snow and ice. Some tires may be manufactured to be more suited to be repairable and retreaded.

Retread tires are used in applications ranging from aircraft landing gear to long-haul tractor-trailers. It is desirable to decrease the time for a retreaded process to improve production. An exemplary envelope spreader system for enveloping a retreaded tire assembly as set forth according to various non-limiting embodiments described herein allows the retreaded tire assembly to pass through the system of enveloping once the retreaded tire assembly is placed within the flexible rubber envelope.

Various embodiments of the envelope spreader system may provide certain technical advantages, including but not limited to 1) expediting a retreading process by facilitating the retread tire assembly to pass through the envelope spreader system after being placed within a flexible rubber envelope, 2) removing specific travel paths to a system for enveloping, 3) providing a system which does not require an operator to move the system from the travel path of the retreaded tire assembly, and 4) providing a system which is able to receive a retreaded tire assembly from either end of the system. The exemplary non-limiting embodiments having such effects are described in more detail below.

II. Terms

As used herein, the term "precured" refers to a material that is cured. Conversely, "uncured" refers to materials that are in their raw form and have not been cured. For example, curing an uncured material results in a cured or precured material.

As used herein, the term "precured tire tread" refers to a tire tread or build-up (e.g., precured product having no tread pattern thereon; blank; slick) that is separate from (e.g., not cured to) a tire casing. Once a precured tire tread has been cured to a tire casing, the precured tire tread becomes a tire tread, and the combination of the precured tread cured to the tire casing forms a tire. The precured tire tread may take the form of a strip, oval, circle, ring, or similar shape.

As used herein, the term "retreaded tire assembly" refers to a pre-cured tread (PCT) assembly applied to a tire casing with an uncured adhesive interposed between the mating surfaces. The retreaded tire assembly may be ready to be positioned within an envelope for curing. A tire may be formed of a retreaded tire assembly that has been cured.

III. Overview of Envelope Spreader System

Figure 1:
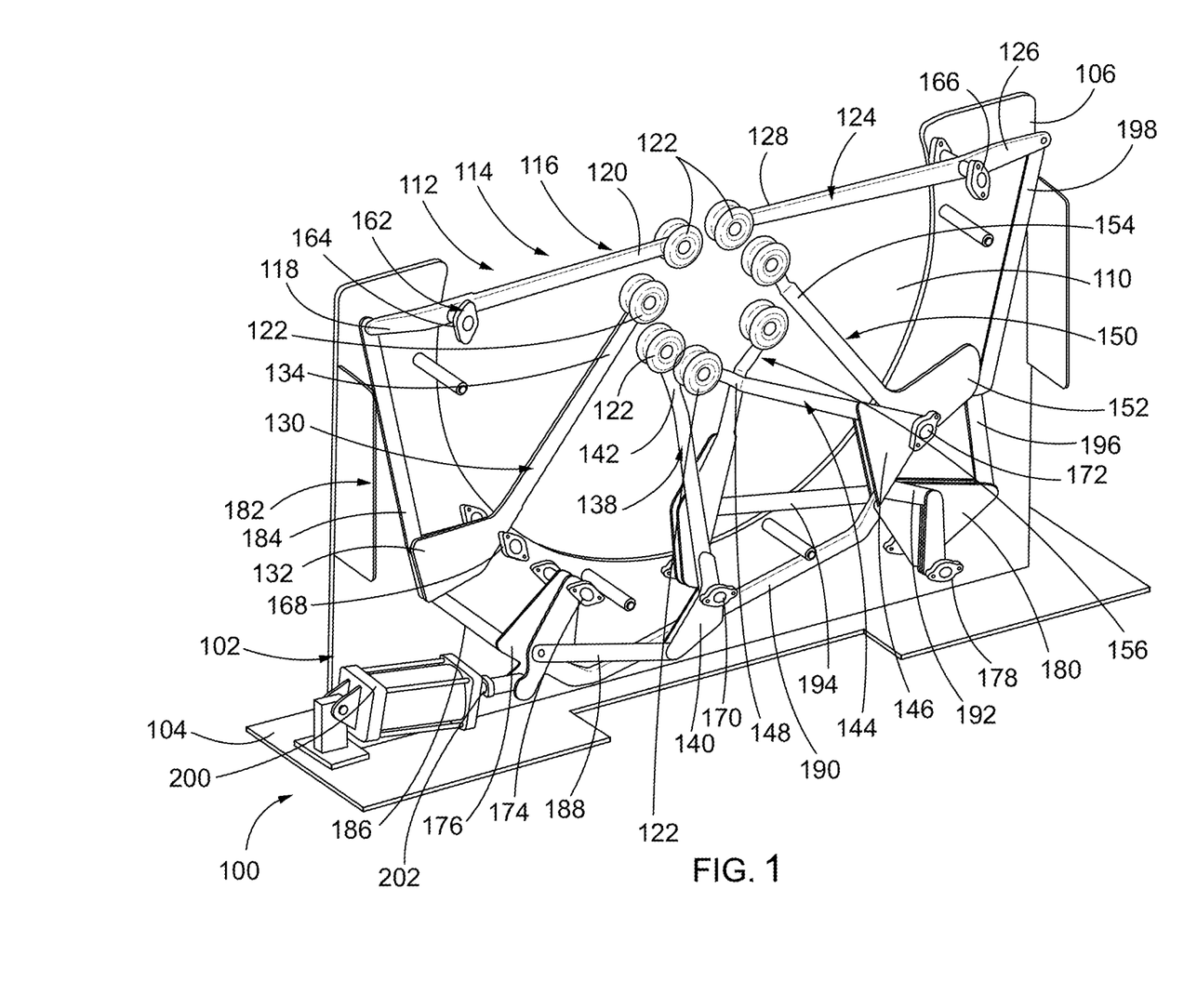
FIG. 1 is a cross-section view of an envelope spreader system.
Figure 2:
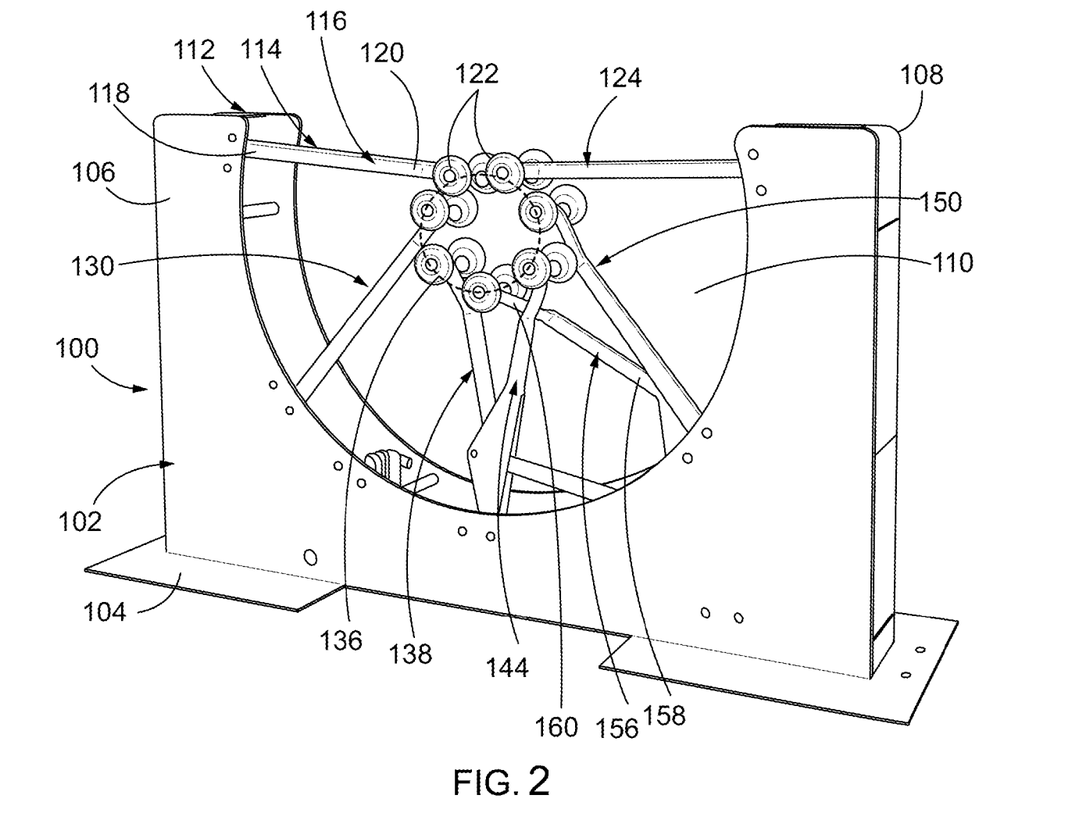
FIG. 2 is a perspective view of the envelope spreader system of FIG. 1.

Referring to FIG. 1 and FIG. 2, an envelope spreader system 100 is shown, according to an example embodiment. The envelope spreader system 100 includes a chassis 102. The chassis 102 includes a chassis base 104. The chassis base 104 is configured to couple (e.g., attached, fixed, welded, fastened, riveted, adhesively attached, bonded, pinned, press-fit, bolted, etc.) the envelope spreader system 100 to a floor of a plant, such as a manufacturing plant where various manufacturing operations involving the manufacturing of retreaded tires take place. The chassis 102 includes first chassis side 106 and a second chassis side 108. The first chassis side 106 is coupled to the chassis base 104. The second chassis side 108 is coupled to the chassis base 104. In some embodiments, the first chassis side 106 is coupled to the second chassis side 108. In some embodiments, the chassis base 104, the first chassis side 106, and the second chassis side 108 are formed of steel or any other similar alloy (e.g., aluminum, iron, stainless steel, etc.) or a combination thereof. The chassis 102 includes an opening or aperture 110. The opening 110 is configured to facilitate a retread tire assembly to pass-through the envelope spreader system 100.

The envelope spreader system 100 includes a linkage assembly 112. The linkage assembly 112 includes a plurality of links 114. The plurality of links 114 are formed of steel or any other similar alloy. The plurality of links 114 are rotatably coupled to the chassis 102 and extend into the opening 110. In some embodiments, the plurality of links 114 are rotatably coupled to the first chassis side 106. In some embodiments, the plurality of links 114 are rotatably coupled to the second chassis side 108. In some embodiments, the plurality of links 114 are coupled to the first chassis side 106 and the second chassis side 108, and are positioned between the first chassis side 106 and the second chassis side 108.

In some embodiments, the plurality of links 114 includes a first link 116 (e.g., primary link, secondary link, tertiary link, etc.). The first link 116 includes a first link first end 118 (e.g., a primary link first end, a secondary link first end, a tertiary link first end, etc.). The first link first end 118 is rotatably coupled to the chassis 102. The first link 116 further includes a first link second end 120 (e.g., a primary link second end, a secondary link second end, a tertiary link second end, etc.). The first link second end 120 extends from the first link first end into the opening 110. In some embodiments, the first link first end 118 is coupled to the first link second end 120 to form the first link 116. The first link second end 120 includes an engaging member 122 (e.g., a tensioner, a wheel, a bar, a clip, etc.). The engaging member 122 is configured to engage a tire envelope, as described herein.

The plurality of links 114 includes a second link 124 (e.g., a primary link, a secondary link, a tertiary link, etc.). In some embodiments, the first link 112 and the second link 124 may be opposed to each other so as to be mirror-images of each other with respect to angle of inclination, height and width. The second link 124 includes a second link first end 126 (e.g., a primary link first end, a secondary link first end, a tertiary link first end, etc.). The second link first end 126 is rotatably coupled to the chassis 102. The second link 124 includes a second link second end 128 (e.g., a primary link second end, a secondary link second end, a tertiary link second end, etc.). The second link second end 128 extends from the second link first end 126 into the opening 110. In some embodiments, the second link first end 126 is coupled to the second link second end 128 to form the second link 124. The second link second end 128 includes the engaging member 122 (e.g., a tensioner, a wheel, a bar, a clip, etc.). The plurality of link also includes a third link 130 (e.g., a primary link, a secondary link, a tertiary link, etc.). The third link includes a third link first end 132 (e.g., a primary link first end, a secondary link first end, a tertiary link first end, etc.). The third link first end 132 is rotatably coupled to the chassis 102. The third link 130 includes a third link second end 134 (e.g., a primary link second end, a secondary link second end, a tertiary link second end, etc.). In some embodiments, third link 130 may have a length approximately equal to that of the first link 114 or second link 124. The third link second end 134 extends from the third link first end 132 into the opening 110. In some embodiments, the third link first end 132 is coupled to the third link second end 134 to form the third link 130. The third link second end 134 includes the engaging member 122 (e.g., a tensioner, a wheel, a bar, a clip, etc.).

Referring to FIG. 2, the envelope spreader system 100 includes a spreading circle 136 (as may also be called a spreading annulus or hoop, or a spreader) in a first position. The spreading circle 136 is bounded at least in part by one or more of the links. The first position of the spreading circle 136 is defined by the position of the first link 116, the second link 124, and the third link 130. In some embodiments, the spreading circle 136 is established by the relative locations of the first link second end 120, the second link second end 128, and the third link second end 134. In some embodiments, the spreading circle 136 is formed by the engaging member 122 of the first link 116, the engaging member 122 of the second link 124 and the engaging member 122 of the third link 130. When the spreading circle 136 is in the first position, the spreading circle 136 has a first diameter, and when the spreading circle is in a second position, the spreading circle has a second diameter larger than the first diameter.

Referring back to FIG. 1, the plurality of links 114 includes a fourth link 138 (e.g., a primary link, a secondary link, a tertiary link, etc.).The fourth link 138 includes a fourth link first end 140 (e.g., a primary link first end, a secondary link first end, a tertiary link first end, etc.). The fourth link first end 140 is rotatably coupled to the chassis 102. The fourth link 138 includes a fourth link second end 142 (e.g., a primary link second end, secondary link second end, tertiary link second end, etc.). The fourth link second end 142 extends from the fourth link first end 140 into the opening 110. In some embodiments, the fourth link first end 140 is coupled to the fourth link second end 142 to form the fourth link 138. The fourth link second end 142 includes the engaging member 122 (e.g., a tensioner, a wheel, a bar, a clip, etc.). The fourth link 138 may be disposed relative to the spreading circle 136 so as to be inclined in a first direction that is a direction from the center of the spreading circle to a position farther away from the center of the spreading circle 136. The third link 130 may be inclined in a second direction that is inclined in a direction from a position further away from the center of the spreading circle 136 to a position closer to the center. The fourth link 138 may be disposed such that the height of the fourth link second end 142 relative to a base of the chassis 102 is less than that of the third link second end 134.

The plurality of links 114 includes a fifth link 144 (e.g., a primary link, a secondary link, a tertiary link, etc.). The fifth link 144 may be disposed so as to have a height relative to a base of chassis 102 that is less than a height of the fourth link 138 relative to the base. The fifth link 144 includes a fifth link first end 146 (e.g., a primary link first end, a secondary link first end, a tertiary link first end, etc.). The fifth link first end 146 is rotatably coupled to the chassis 102. The fifth link 144 includes a fifth link second end 148 (e.g., a primary link second end, a secondary link second end, a tertiary link second end, etc.). The fifth link second end 148 extends from the fifth link first end 146 into the opening 110. In some embodiments, the fifth link first end 146 is coupled to the fifth link second end 148 to form the fifth link 144. The fifth link second end 148 includes the engaging member 122 (e.g., a tensioner, a wheel, a bar, a clip, etc.).

The plurality of links 114 includes a sixth link 150 (e.g., a primary link, a secondary link, a tertiary link, etc.). The sixth link 150 may be disposed so as to have a height relative to a base of chassis 102 that is greater than a height of fifth link 144. The sixth link 150 may be inclined in a direction from a position farther from a center of spreading circle 136 to a position closer to the center. In some embodiments, the sixth link 150 may be disposed relative to the spreading circle 136 so as to be inclined in a first direction that is a direction from the center of the spreading circle to a position farther away from the center of the spreading circle 136. The position may be in an opposite direction from the direction of the third link 130. The sixth link 150 includes a sixth link first end 152 (e.g., a primary link first end, a secondary link first end, a tertiary link first end, etc.). The sixth link first end 152 is rotatably coupled to the chassis 102. The sixth link 150 includes a sixth link second end 154 (e.g., a primary link second end, secondary link second end, tertiary link second end, etc.). The sixth link second end 154 extends from the sixth link first end 152 into the opening 110. In some embodiments, the sixth link first end 152 is coupled to the sixth link second end 154 to form the sixth link 150. The sixth link second end 154 includes the engaging member 122.

The plurality of links 114 includes a seventh link 156 (e.g., a primary link, a secondary link, a tertiary link, etc.). The seventh link 156 includes a seventh link first end 158 (e.g., a primary link first end, a secondary link first end, a tertiary link first end, etc.). The seventh link first end 158 is rotatably coupled to the chassis 102. The seventh link 156 includes a seventh link second end 160 (e.g., a primary link second end, a secondary link second end, a tertiary link second end, etc.). The seventh link second end 160 extends from the seventh link first end 158 into the opening 110. In some embodiments, the seventh link first end 158 is coupled to the seventh link second end 160 to form the seventh link 156. The seventh link second end 160 includes the engaging member 122 (e.g., a tensioner, a wheel, a bar, a clip, etc.). In some embodiments, in contrast to the first through sixth links, the seventh link 156 may include an end portion having a curved segment (a curved portion), so as to be at least partially non-linear.

Referring again to the spreading circle 136, in some embodiments, the spreading circle 136 is disposed to be substantially encircled by a plurality of the aforementioned links. For example, in some embodiments, the spreading circle 136 is defined by the position of at least three of the first link 116, the second link 124, the third link 130, the fourth link 138, the fifth link 144, the sixth link 150, and the seventh link 156. In some embodiments, the spreading circle 136 is defined by the position of each of the plurality of links 114.

The linkage assembly 112 includes a plurality of pivot points 162 (e.g., rods, bars, shafts, etc.). Each of the plurality of pivot points 162 are coupled to chassis 102 in a fixed position relative to one another. Each of the plurality of pivot points 162 are formed of steel or any other similar alloys. In some embodiments, each of the plurality of pivot points 162 extend between the first chassis side 106 and the second chassis side 108 and are coupled to the first chassis side 106 and second chassis side 108. Each of the plurality of pivot points 162 are configured to facilitate rotation of each of the plurality of links 114. The plurality of pivot points 162 includes a first pivot point 164 (e.g., a primary pivot point, a secondary pivot point, a tertiary pivot point, etc.) coupled to the chassis 102 in a fixed position. The first link 116 extends from the first link first end 118 to the second link second end and is rotatably coupled to the first pivot point 164 between the first link first end 118 and the first link second end 120 such that the first link 116 is configured to rotate about the first pivot point 164. The plurality of pivot points 162 includes a second pivot point 166 (e.g., a primary pivot point, a secondary pivot point, a tertiary pivot point, etc.). The second pivot point 166 is coupled to the chassis 102 in a fixed position. In some embodiments, the second pivot point 166 is coupled to the chassis 102 in a fixed position opposite of the first pivot point 164 relative to a center axis of the envelope spreader system 100. The second link 124 extends from the second link first end 126 to the second link second end 128 and is rotatably coupled to the second pivot point 166 between the second link first end 126 and the second link second end 128 such that the second link 124 is configured to rotate about the second pivot point 166.

The plurality of pivot points 162 includes a third pivot point 168 (e.g., a primary pivot point, a secondary pivot point, a tertiary pivot point, etc.). The third pivot point 168 is coupled to the chassis 102 in a fixed position adjacent to the first pivot point 164. The third link 130 extends from the third link first end 132 to the third link second end 134 and is rotatably coupled to the third pivot point 168 between the third link first end 132 and the third link second end 134 such that the third link 130 is configured to rotate about the third pivot point 168.

The plurality of pivot points 162 includes a fourth pivot point 170 (e.g., a primary pivot point, a secondary pivot point, a tertiary pivot point, etc.) coupled to the chassis 102 in a fixed position. In some embodiments, the fourth pivot point 170 is coupled to the chassis 102 in a fixed position adjacent to the chassis base 104. The fourth link 138 extends from the fourth link first end 140 to the fourth link second end 142 and is rotatably coupled to the fourth pivot point 170 between the fourth link first end 140 and the fourth link second end 142 such that the fourth link 138 is configured to rotate about the fourth pivot point 170. In some embodiments, the seventh link 156 extends from the seventh link first end 158 to the seventh link second end 160 and rotatably couples to the fourth pivot point 170 between the seventh link first end 158 and the seventh link second end 160 such that the seventh link 156 is configured to rotate about the fourth pivot point 170.

The plurality of pivot points 162 includes a fifth pivot point 172 (e.g., a primary pivot point, a secondary pivot point, a tertiary pivot point, etc.). The fifth pivot point 172 is coupled to chassis 102 in a fixed position. In some embodiments, the fifth pivot point 172 is coupled to the chassis 102 in a fixed position between the second pivot point 166 and the fourth pivot point 170. The fifth link 144 extends from the fifth link first end 146 to the fifth link second end 148 and is rotatably coupled to the fifth pivot point 172 between the fifth link first end 146 and the fifth link second end 148 such that the fifth link 144 is configured to rotate about the fifth pivot point 172. In some embodiments, the sixth link 150 extends from sixth link first end 152 to the sixth link second end 154 and is rotatably coupled to the fifth pivot point 172 between the sixth link first end 152 and the sixth link second end 154 such that the sixth link 150 is configured to rotate about the fifth pivot point 172.

The plurality of pivot points 162 includes a sixth pivot point 174 (e.g., a primary pivot point, a secondary pivot point, a tertiary pivot point, etc.). The sixth pivot point 174 is coupled to the chassis 102 at a fixed position. In some embodiments, the sixth pivot point 174 is coupled to the chassis 102 at a fixed position between third pivot point 168 and the fourth pivot point 170. The linkage assembly 112 includes a first flange 176. The first flange 176 is rotatably coupled to the sixth pivot point 174 and configured to rotate about the chassis 102. In some embodiments, the first flange 176 is configured to rotate about the sixth pivot point 174.

The plurality of pivot points 162 includes a seventh pivot point 178. The seventh pivot point 178 is coupled to the chassis 102 at a fixed position. In some embodiments, the seventh pivot point 178 is coupled to the chassis 102 at a fixed position adjacent to the chassis base 104 and adjacent to the fifth pivot point 172. The linkage assembly includes second flange 180 that is rotatably coupled to the seventh pivot point 178.

The linkage assembly 112 includes a plurality of connection members 182. The plurality of connection members 182 are configured to cause rotation of the plurality of links 114. The plurality of connection members 182 are formed of steel or other alloys. The plurality of connection members includes a first connection member 184 (e.g., a primary connection member, a secondary connection member, a tertiary connection member). The first connection member 184 is operably coupled to the first link 116. In some embodiments the first connection member 184 is operably coupled to the first link first end 118. The first connection member 184 is operably coupled to the third link 130. In some embodiments, the first connection member 184 is operably coupled to the third link first end 132. The first connection member 184 is configured to cause the rotation of the first link 116 about the first pivot point 164.

The plurality of connection members 182 includes a second connection member 186 (e.g., a primary connection member, a secondary connection member, a tertiary connection member, etc.). The second connection member 186 is operably coupled to the third link 130. In some embodiments, the second connection member 186 is operably coupled to the third link first end 132. The second connection member 186 is also operably coupled to the first flange 176. The second connection member 186 is configured to cause the rotation of the third link 130 about the third pivot point 168.

The plurality of connection members 182 includes a third connection member 188 (e.g., a primary connection member, a secondary connection member, a tertiary connection member). The third connection member 188 is operably coupled to the first flange 176. The third connection member 188 is operably coupled to the fourth link 138. In some embodiments, the third connection member 188 is coupled to the fourth link first end 140. The third connection member 188 is configured to cause the rotation of the first flange 176 about the sixth pivot point 174. The third connection member 188 may be configured to cause the rotation of the fourth link 138 about the fourth pivot point 170.

As shown in FIG. 1, the plurality of connection members 182 includes a driving member (a driver, etc.) 190. The driving member 190 is operably coupled to the first flange 176. The driving member 190 is operably coupled to the second flange 180. The driving member 190 is configured to cause the second flange 180 to rotate about the seventh pivot point 178. For example, as an actuator (as described herein), causes the first flange 176 to rotate about the sixth pivot point 174, the driving member 190 is driven causing the second flange to rotate about the seventh pivot point 178.

Additionally, the plurality of connection members includes a fourth connection member 192 (e.g., a primary connection member, a secondary connection member, a tertiary connection member). The fourth connection member 192 is operably coupled to the second flange 180. The fourth connection member 192 is operably coupled to the fifth link 144. In some embodiments, the fourth connection member 192 is operably coupled to the fifth link first end 146. The fourth connection member 192 is configured to cause the fifth link 144 to rotate about the fifth pivot point 172.

The plurality of connection members 182 includes a fifth connection member 194 (e.g., a primary connection member, a secondary connection member, a tertiary connection member). The fifth connection member 194 is operably coupled to the seventh link 156. In some embodiments, the fifth connection member 194 is operably coupled to the seventh link first end 158. The fifth connection member 194 is operably coupled to the second flange 180. The fifth connection member 194 is configured to cause the seventh link rotate about the fourth pivot point 170.

The plurality of connection members 182 further includes a sixth connection member 196 (e.g., a primary connection member, a secondary connection member, a tertiary connection member). The sixth connection member 196 is operably coupled to the second flange 180. The sixth connection member 196 is operably coupled to sixth link 150. In some embodiments, the sixth connection member 196 is operably coupled to the sixth link first end 152. The sixth connection member 196 is configured to cause the sixth link 150 to rotate about the fifth pivot point 172.

The plurality of connection members 182 also includes a seventh connection member 198 (e.g., a primary connection member, a secondary connection member, a tertiary connection member). The seventh connection member 198 is operably coupled to the second link 124. In some embodiments, the second link 124 is operably coupled to the second link first end 126. The seventh connection member 198 is operably coupled to the sixth link 150. In some embodiments, the seventh connection member 198 is operably coupled to the sixth link first end 152. The seventh connection member 198 is configured to cause the second link 124 to rotate about the second pivot point 166.

Figure 3:
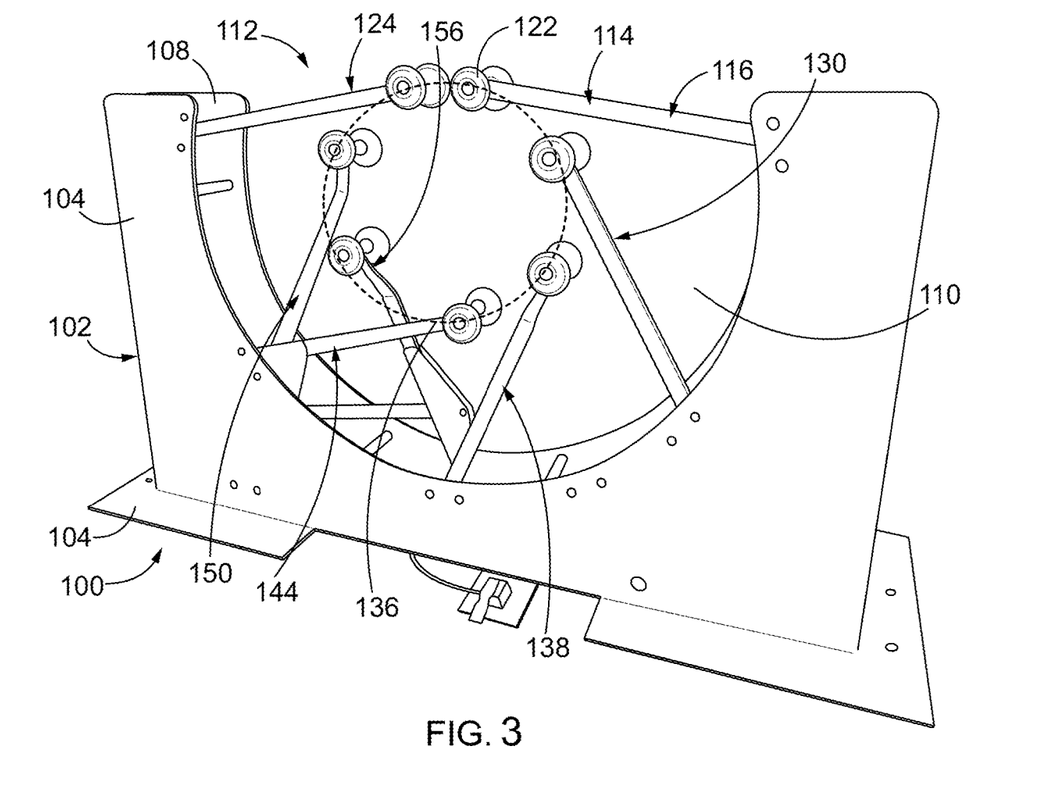
FIG. 3 is a perspective view of the envelope spreader system of FIG. 1.
Figure 4:
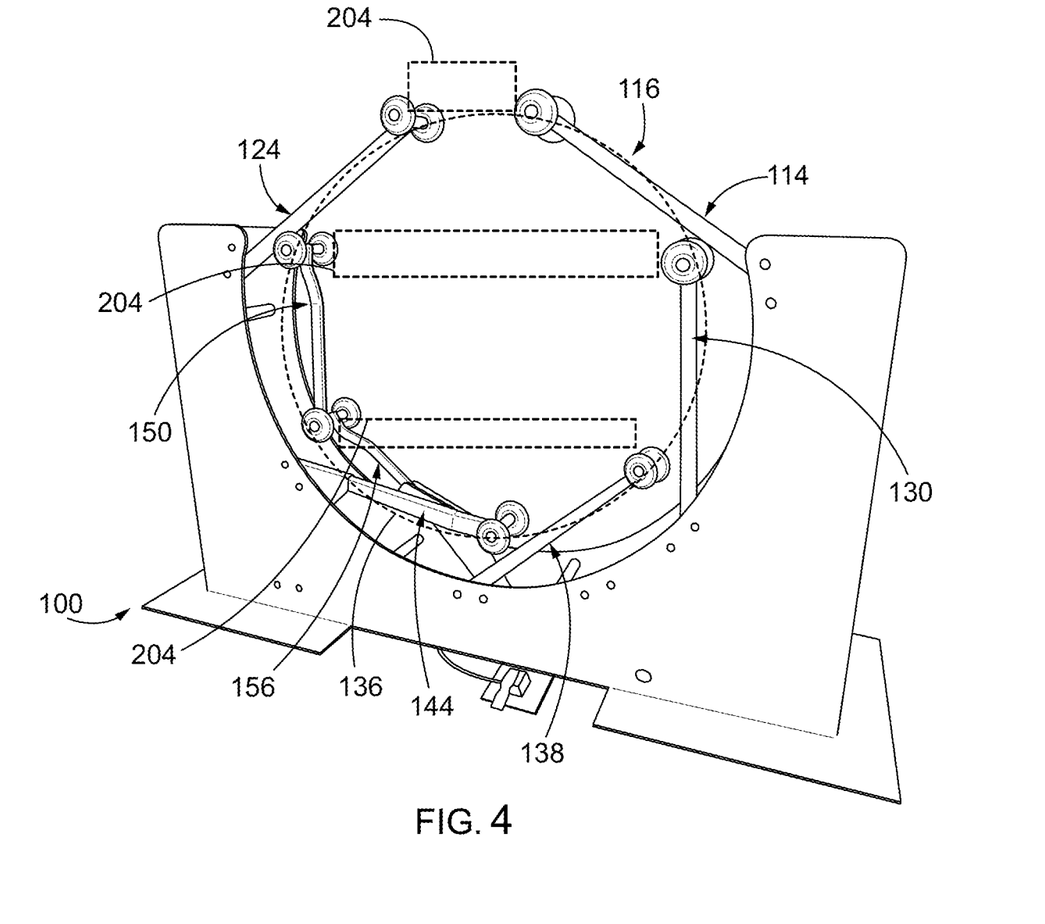
FIG. 4 is a perspective view of the envelope spreader system of FIG. 1.

The envelope spreader system 100 includes an actuator 200 (e.g., linear actuator, hydraulic piston actuator, pneumatic actuator, etc.). The actuator 200 is fixed to the chassis base 104 and operably coupled to the linkage assembly 112 to operate the linkage assembly 112 from a first position to a second position. In some embodiments, as seen in FIGS. 2-4, the actuator 200 is configured to cause the spreading circle 136 to move from a first position to a second position. The actuator 200 includes an actuator arm 202 which is operably coupled to the first flange 176. As the actuator 200 is operated, the actuator arm linearly extends causing the first flange 176 to rotate about the sixth pivot point 174. In some embodiments, the actuator 200 is operated manually. In some embodiments, the actuator 200 is operated with a controller system. As the first flange 176 rotates about the sixth pivot point 174, the second connection member 186 is caused to move. In some embodiments, the second connection member 186 moves toward the chassis base 104. The second connection member 186 moves which causes the third link 130 to rotate about the third pivot point 168 relative to the chassis 102.

As the third link 130 rotates about the third pivot point 168, the first connection member 184 is caused to move. In some embodiments, the first connection member 184 moves substantially linearly toward the chassis base 104. As the first connection member 184 moves, the first link 116 is caused to rotate about the first pivot point 164 relative to the chassis 102. In some embodiments, the first link 116 is configured to rotate in a similar direction as the third link 130.

Further, as the actuator 200 causes the first flange 176 to rotate about the sixth pivot point 174, the first flange 176 causes the third connection member 188 to move substantially linearly toward the fourth pivot point 170. As the third connection member 188 moves linearly toward the fourth pivot point 170, the fourth link 138 is caused to rotate about the fourth pivot point 170. In some embodiments, the fourth link 138 rotates about the fourth pivot point in a similar direction as the first link 116 and the third link 130.

Additionally, as the actuator 200 causes the first flange 176 to rotate about the sixth pivot point 174, the first flange 176 causes the driving member 190 to move (e.g., linearly, rotationally, etc.). As the driving member 190 moves, the second flange 180 is caused to rotate about the seventh pivot point 178 relative to the chassis 102. In some embodiments, the second flange rotates about the seventh pivot point 178 in an opposite direction as the first flange 176 relative to the chassis 102. For example, as the first flange 176 rotates in a counter-clockwise direction relative to the chassis 102, the second flange 180 rotates in a clockwise direction relative to the chassis 102. In yet another example, as the first flange 176 rotates in a clockwise direction relative to the chassis 102, the second flange 180 rotates in a counter-clockwise direction relative to the chassis 102.

As the second flange 180 rotates about the seventh pivot point 178, the fourth connection member 192 moves substantially linearly away from the opening 110. As the fourth connection member 192 moves substantially linearly away from the opening 110, the fifth link 144 is caused to rotate about the fifth pivot point 172 relative to the chassis 102. In some embodiments, the fifth link 144 is caused to rotate in a similar direction as the first link 116, the third link 130, and the fourth link 138.

Further, as the second flange 180 rotates about the seventh pivot point 178, the fifth connection member 194 is caused to move substantially linearly toward the seventh pivot point 178. As the fifth connection member 194 moves, the seventh link 156 is caused to rotate about the fourth pivot point 170. In some embodiments, the seventh link 156 is caused to rotate about the fourth pivot point in an opposite direction of the fourth link 138.

As the second flange 180 rotates about the seventh pivot point 178, the sixth connection member 196 is caused to move substantially linearly toward the chassis base 104. As the sixth connection member 196 moves toward the chassis base 104, the sixth link 150 is caused to rotate about the fifth pivot point 172 relative to the chassis 102. In some embodiments, the sixth link 150 is caused to rotate in an opposite direction as the third link 130. In some embodiments, the sixth link 150 is caused to rotate in a similar direction as the seventh link 156.

As the sixth link 150 rotates about fifth pivot point 172, the seventh connection member 198 is caused to move substantially linearly toward the chassis base 104. As the seventh connection member 198 moves, the second link 124 is caused to rotate about the second pivot point 166 relative to the chassis 102. In some embodiments, the second link 124 is caused to rotate about the second pivot point 166 in an opposite direction of the first link 116.

As seen in FIG. 3, as the actuator 200 causes each of the plurality of links 114 to rotate about the respective pivot points of the plurality of pivot points 162 of each of the plurality of links 114, the linkage assembly 112 is caused to be operated from a first position to a second position. As the linkage assembly 112 is caused to be operated, the spreading circle 136 is in an intermediate position. The intermediate position is a position of the spreading circle 136 between the first position and the second position. When the spreading circle 136 is in the intermediate position, the spreading circle 136 has an intermediate diameter which is larger than the diameter of the first position and smaller than the diameter of the second position.

As seen in FIG. 4, the actuator 200 operates the linkage assembly 112 to a second position. As the linkage assembly 112 is operated to the second position, the spreading circle 136 is in the second position and is defined by at least the first link 116, the second link 124 and the third link 130 in the second position. When the spreading circle 136 is in the second position, the spreading circle 136 has a second diameter which is larger than the diameter of the first position.

When the actuator 200 operates the linkage assembly 112 to the second position, an end gap 204 is formed between the plurality of links 114. The end gap 204 defines the size of the space between at least two of the plurality of links 114 which rotate in opposite direction. As seen in FIG. 4, an end gap 204 is formed between the first link 116 and the second link 124. In some embodiments the end gap 204 is formed between the fourth link 138 and the seventh link 156. The end gap 204 has a length in a range between 16 inches (in.) and 45 inches (e.g., 15.2 in., 16 in., 20 in., 24 in., 28 in., 32 in., 36 in., 40 in., 44 in., 45 in., 47.25 in., etc.).

Figure 5:
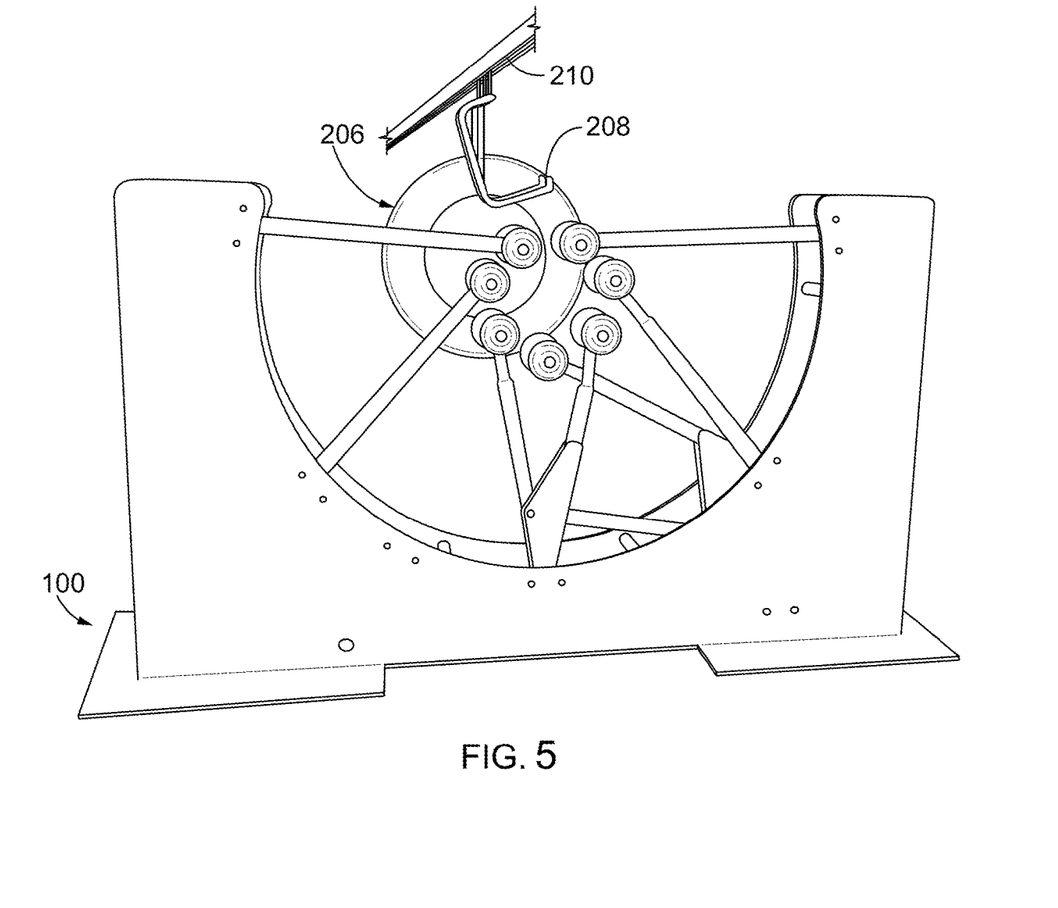
FIG. 5 is a front view of the envelope spreader system of FIG. 1 and a retread tire assembly, according to one embodiment.

Referring now to FIGS. 6-10, the envelope spreader system 100 and a retreaded tire assembly 206 in operation are shown. The retreaded tire assembly 206 is an assembled uncured retreaded tire carcass with a pre-cured retread positioned on the tire carcass. The retreaded tire assembly 206 is placed on a hook 208 (e.g., J-hook, clamp, holder, etc.) at a location distal from the envelope spreader system 100. The hook 208 is coupled to a monorail system 210. The monorail system 210 is a transport system installed at a plant, for example. The monorail system 210 is configured to transport a retreaded tire assembly 206 between the various locations where processes for retreading a tire take place. The monorail system 210 may be bi-directional such that the monorail system 210 may transport the tire in a forward direction and a backward direction with respect to envelope spreader system 100. In this way, the tire may be transported in the same manner regardless of whether it needs to be moved backwards or forwards. As seen in FIG. 5, the retreaded tire assembly 206 is placed on the hook 208 and the monorail system 210 is configured to transport the retreaded tire assembly 206 to the envelope spreader system 100 such that the retreaded tire assembly 206 can be prepared for curing.

Figure 6:
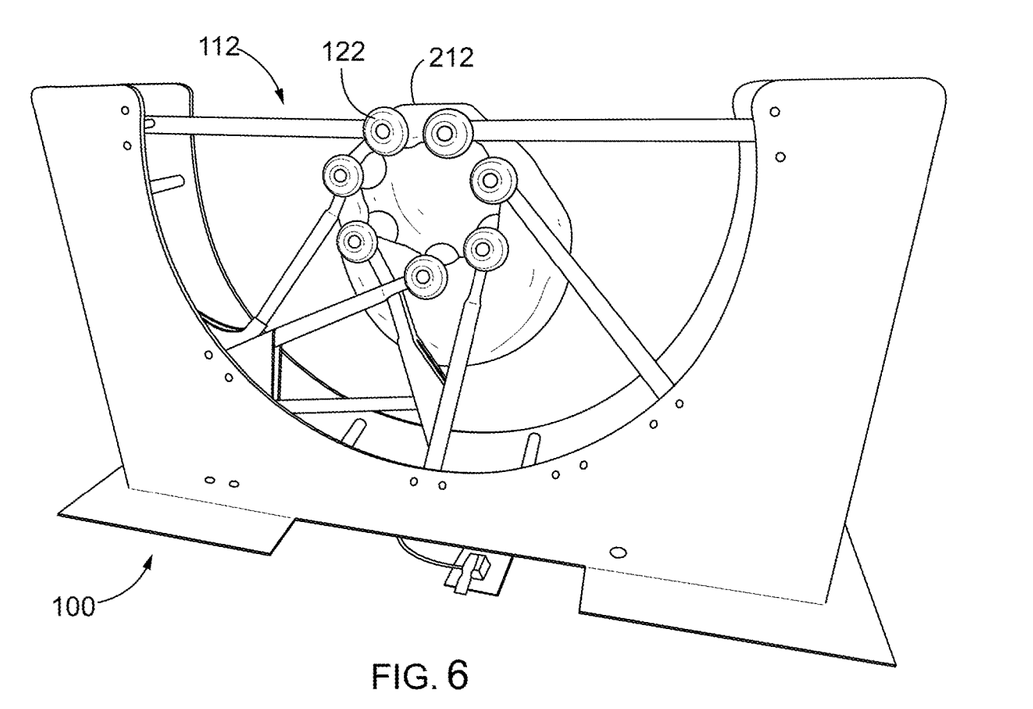
FIG. 6 is a perspective view of the envelope spreader system of FIG. 1.
Figure 7:
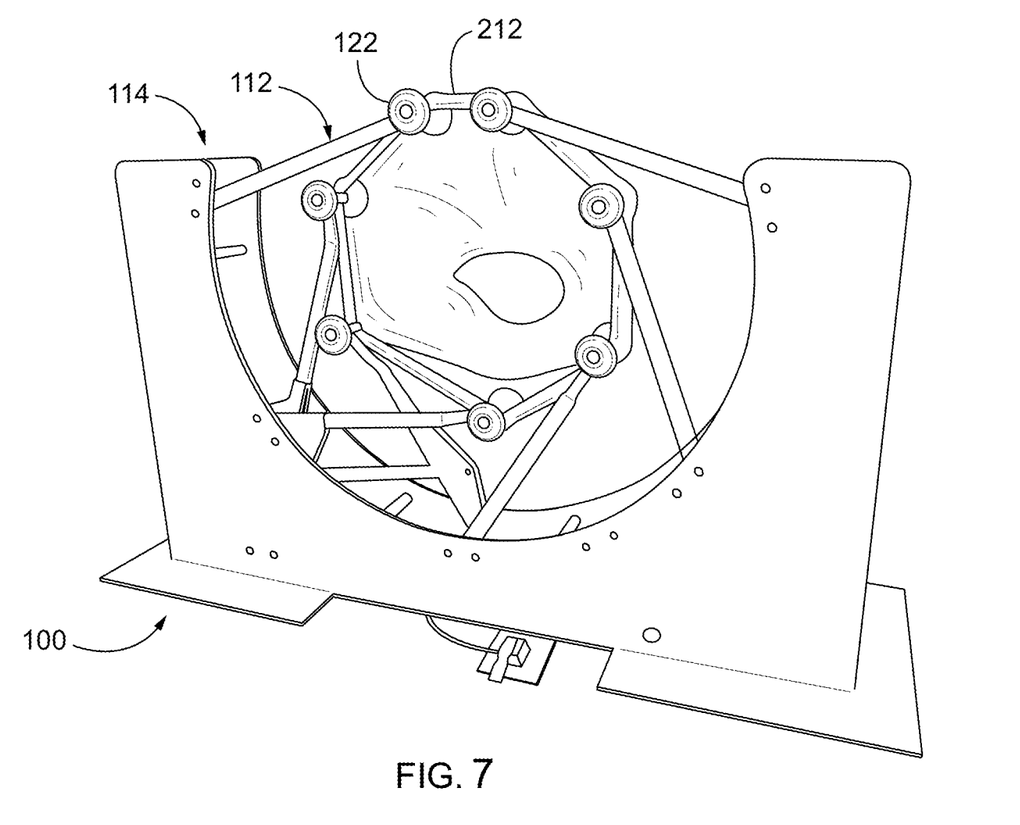
FIG. 7 is a perspective view of the envelope spreader system of FIG. 1.
Figure 8:
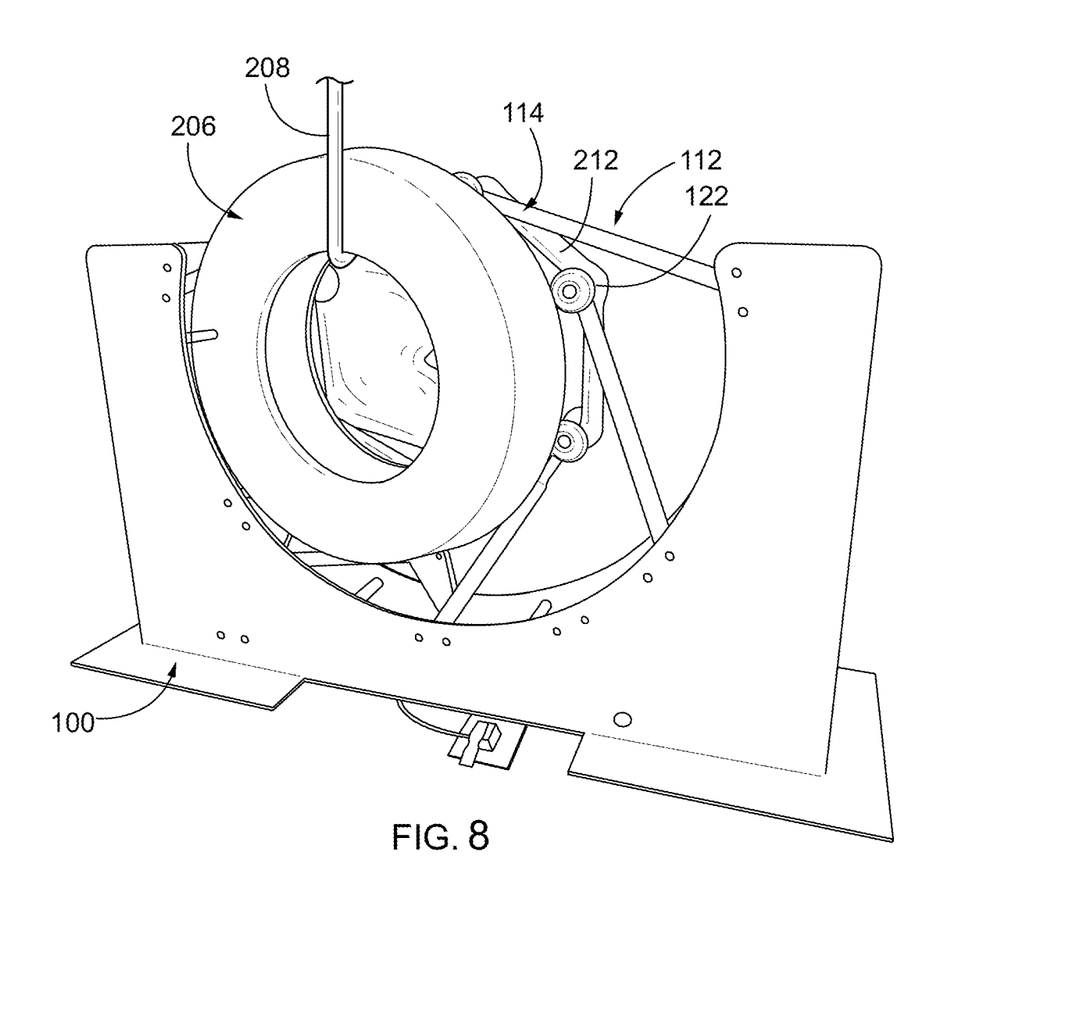
FIG. 8 is a perspective view of the envelope spreader system of FIG. 1 and the retread tire assembly of FIG. 5.
Figure 9:
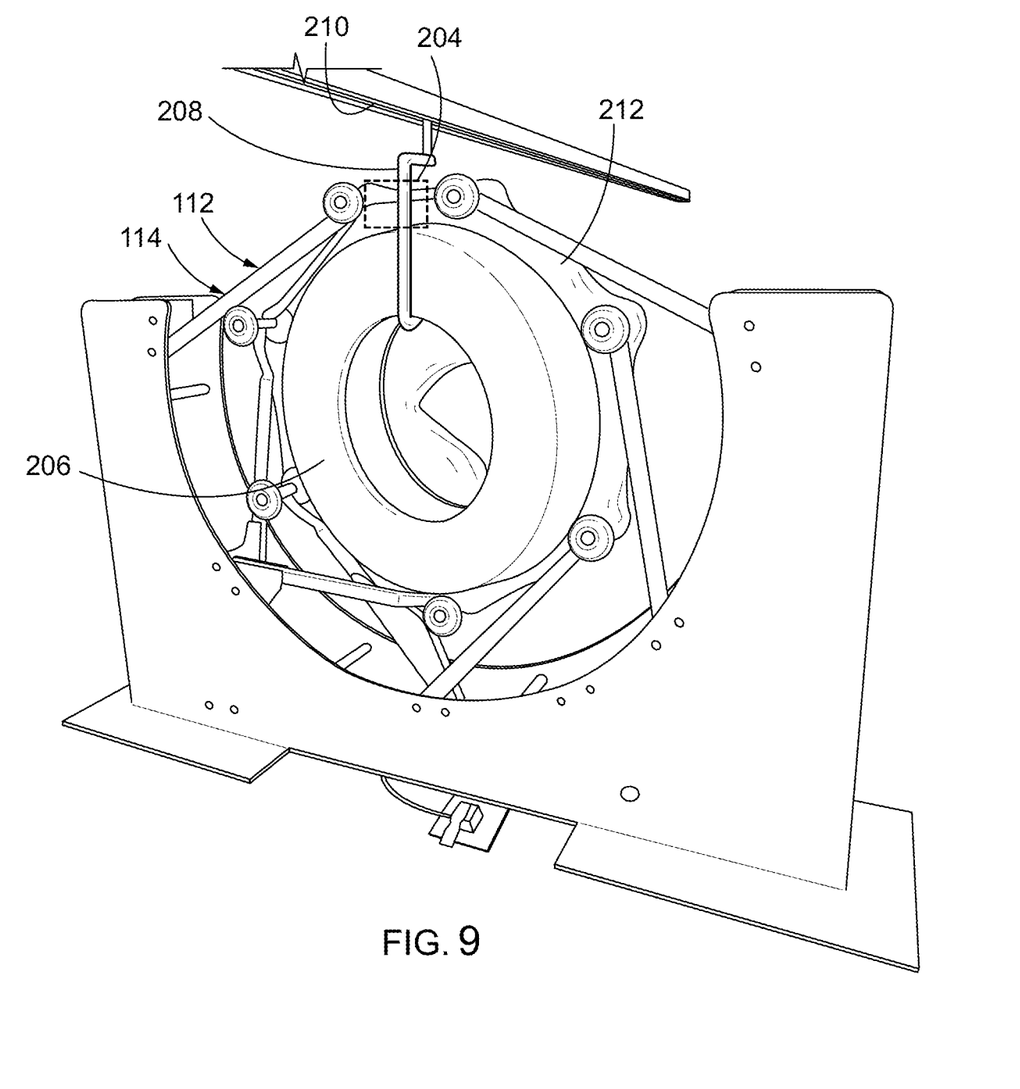
FIG. 9 is a perspective view of the envelope spreader system of FIG. 1 and a retread tire assembly of FIG. 5.
Figure 10:
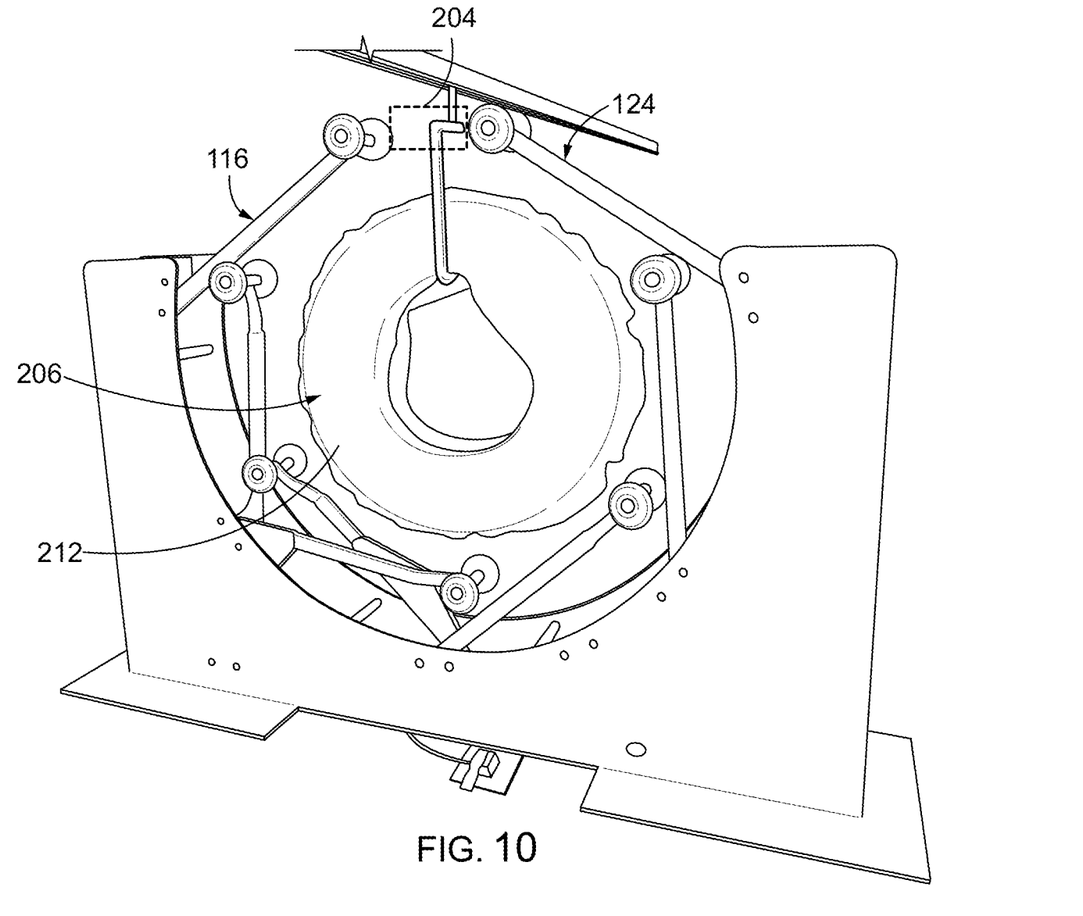
FIG. 10 is a perspective view of the envelope spreader system of FIG. 1 and a retread tire assembly of FIG. 5.

As seen in FIG. 6, the linkage assembly 112 of the envelope spreader system 100 is in a first position. In the first position, a tire envelope 212 for curing is coupled to at least three of the engaging members 122 of the plurality of links 114. In some embodiments, the tire envelope 212 is configured to be coupled to at least three of a second ends (a primary link second end, a secondary link second end, a tertiary link second end, etc.) of the plurality of links. The tire envelope 212 may be a flexible rubber configured to receive the retreaded tire assembly 206. In some embodiments, the inner edge of tire envelope 212 is coupled to the engaging members 122 of the plurality of links 114. As seen in FIGS. 7 and 8, as the envelope spreader system 100 is operated such that the actuator 200 causes the linkage assembly 112 to operate from a first position to a second position, the tire envelope 212 is caused to deform (e.g., to stretch and expand). As seen in FIG. 9, when the linkage assembly 112 is operated to a second position, the retreaded tire assembly 206 is placed within the tire envelope 212. Here, the monorail system 210 is operated to cause the hook 208 and the retreaded tire assembly 206 to move toward the envelope spreader system 100 until the retreaded tire assembly 206 is positioned within the tire envelope 212. As seen in FIG. 10, once the retreaded tire assembly 206 is placed within the tire envelope 212, the monorail system 210 operates the hook 208 such that the hook 208 may pass through the end gap 204 between the first link 116 and the second link 124.

Certain systems for enveloping a retreaded tire are configured to be manually movable such that an operator must move the entire system so that a retreaded tire assembly could be transported to a curing chamber. Additionally, these systems need to be positioned off the path of a continuous monorail system transporting the retreaded tire assembly. These systems impose additional burdens on an operator and increase the manufacturing time for manufacturing a retreaded tire. In particular, such systems require an operator to continuously move the systems for enveloping a retreaded tire assembly from a storing or non-use location to the use location every time a retreaded tire assembly needs to be placed within a curing envelope. Further, time is also increased because the retreaded tire assembly is required to travel along multiple paths before reaching a final destination.

In contrast, the aforementioned envelope spreader system 100 and the various components described herein, provide certain benefits over the current systems. First, a retreaded tire assembly 206 may remain on the monorail system 210 and follow a travel path from a first location at the plant to a final location (e.g., curing chamber, etc.) at the plant. Due to the envelope spreader system 100 being located along the travel path and allowing retreaded assembly 206 to pass-through (e.g., the envelope spreader system 100 and the various components do not interfere with the path of the retreaded tire assembly 206), the retreaded tire assembly does not have to take a separate path to be placed within the tire envelope 212. Additionally, the envelope spreader system 100 may also be fixed to the plant without requiring an operator to manually move the envelope spreader system 100 so that the retreaded tire assembly 206 may continue along the travel path because the retreaded tire assembly 206 is facilitated to pass-through the envelope spreader system 100. Further, the aforementioned configurations of the envelope spreader system 100, facilitate bi-directional (e.g., forward, backward, etc.) movement of the retreaded tire assembly 206 along the monorail system 210 and the travel path. Due to the linkage assembly 112 operating from the first position to the second position, as described herein, and causing the spreading circle 136 to move from the first position to the second position as described herein, the retreaded tire assembly 206 may move through the envelope spreader system 100 bi-directionally (forward, backward, etc.) when the spreading circle 136 is in the second position. This facilitates flexibility for a manufacturer when retreading a tire and expedites the retreading process.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the invention unless otherwise claimed.

It should be noted that the term "example" as used herein to describe some embodiments is intended to indicate that some embodiments are possible examples, representations, and/or illustrations of possible embodiments (and such term is not intended to connote that some embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

Some embodiments are described herein. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, embodiments include all modifications and equivalents of the subject matter recited in the claims appended hereto as permitted by applicable law. Moreover, any combination of the above-described elements in all possible variations thereof is encompassed by the embodiments unless otherwise indicated herein or otherwise clearly contradicted by context.

It is important to note that the construction and arrangement of the various embodiments are illustrative only. Although some embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter described herein.

While this specification contains specific implementation details, these should not be construed as limitations on the scope of this disclosure or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An envelope spreader system comprising:
    a chassis having an opening configured to receive a tire assembly in an upright orientation;
    a linkage assembly, the linkage assembly comprising a plurality of links rotatably coupled to the chassis and extending into the opening, wherein the plurality of links comprises:
        a primary link rotatably coupled to the chassis at a first fixed pivot point between a primary link first end and a primary link second end configured to operably engage a portion of a tire envelope;
        a secondary link rotatably coupled to the chassis at a second fixed pivot point between a secondary link first end and a secondary link second end configured to operably engage a portion of the tire envelope;
    a spreader defined in part by the primary link second end and the secondary link second end; and
    an actuator operably coupled to the primary link first end and the secondary link first end and configured to operate the linkage assembly between a first position and a second position.

2. The envelope spreader system of claim 1, wherein the plurality of links comprises:
    a tertiary link having a tertiary link first end rotatably coupled to the chassis at a third fixed pivot point and a tertiary link second end configured to operably engage a portion of the tire envelope;
    wherein the primary link second end, the secondary link second end, and the tertiary link second end define three points of the spreader,
    wherein the spreader in the first position has a first diameter and the spreader in the second position has a second diameter differing from the first diameter.

3. The envelope spreader system of claim 2, wherein the first diameter of the spreader in the first position is smaller than the second diameter of the spreader in the second position.

4. The envelope spreader system of claim 1, wherein:
    the chassis includes a first chassis side and a second chassis side; and
    the opening is substantially circular and is configured to receive the tire assembly from both the first chassis side and the second chassis side.

5. The envelope spreader system of claim 1, wherein each of the first fixed pivot point and second fixed pivot point are coupled to the chassis relative to one another.

6. The envelope spreader system of claim 2, wherein the spreader is formed as an annulus.

7. An envelope spreader system comprising:
    a linkage assembly operable between a first position and a second position, the linkage assembly comprising a plurality of links, each of the plurality of links rotatable about at least one pivot point of a plurality of pivot points, and each of the plurality of pivot points being in a fixed position relative to one another, wherein the plurality of links comprises a primary link and a secondary link rotatable about the same pivot point; and
    an actuator operably coupled to the linkage assembly and configured to operate the linkage assembly between the first position and the second position.

8. The envelope spreader system of claim 1, wherein:
    the primary link is configured to rotate in a first rotational direction when the linkage assembly transitions toward the second position; and
    the secondary link is configured to rotate in a second rotational direction when the linkage assembly transitions toward the second position,
    wherein the first rotational direction is opposite to the second rotational direction.

9. The envelope spreader system of claim 7, wherein the actuator is a hydraulic piston actuator.

10. The envelope spreader system of claim 7, wherein each of the plurality of links comprises a first end and a second end, the second end configured to engage a tire envelope, the second ends defining an annular spreader, the spreader having a diameter that is greater in the second position than in the first position.

11. The envelope spreader system of claim 7, wherein: the primary link comprises a primary link first end rotatably coupled to a chassis and a primary link second end positioned within an opening, the primary link second end configured to engage an inner edge of a tire envelope, and the secondary link comprises a secondary link first end rotatably coupled to the chassis and a secondary link second end positioned within the opening and configured to engage the inner edge of the tire envelope, the primary link and the secondary link extending substantially away from one another such that the secondary link second end and the primary link second end are separated from one another by an end gap.

12. The envelope spreader system of claim 7, wherein: the primary link comprises a primary link first end rotatably coupled to a chassis and a primary link second end positioned within an opening, the primary link second end configured to engage an inner edge of a tire envelope, and the secondary link comprising a secondary link first end rotatably coupled to the chassis and a secondary link second end positioned within the opening and configured to engage the inner edge of the tire envelope.

* * * * *